United States Patent Office 3,008,956
Patented Nov. 14, 1961

3,008,956
PROCESS FOR THE RECOVERY OF 6-AMINOPENICILLANIC ACID
Donald E. Nettleton, Jr., Syracuse, Irving R. Hooper, Fayetteville, and David A. Johnson and Glenn A. Hardcastle, Jr., Syracuse, N.Y., assignors, by mesne assignments, to Beecham Research Laboratories Ltd., Brentford, Middlesex, England, a corporation of Great Britain and Northern Ireland
No Drawing. Filed Aug. 3, 1959, Ser. No. 831,041
6 Claims. (Cl. 260—239.1)

This invention relates to a new and useful process for the recovery of 6-aminopenicillanic acid from aqueous solutions thereof and, more particularly, relates to the recovery of 6-aminopenicillanic acid from fermentation broths.

The recovery in a simple economic fashion and high yield of a water-soluble compound such as 6-aminopenicillanic acid from dilute aqueous solutions, including fermentation broths and ion exchange resin eluates, presents a difficult problem. Ordinary processes of extraction at various pH's are not satisfactory and no satisfactory methods of precipitation are known which are effective when used on very dilute solutions. Recovery of 6-aminopenicillanic acid from fermentation broths is complicated by the presence in such broths of various impurities, including some penicillins, formed during the fermentation process, and by the difficulties encountered in causing 6-aminopenicillanic acid to be adsorbed on and eluted from ion exchange resins.

The present invention is broadly directed to an improved method for the recovery of 6-aminopenicillanic acid from aqueous solutions thereof. It is a particular object of the invention to provide a novel improved process for the separation and removal of 6-aminopenicillanic acid from fermentation broths in which such compound is produced. It is also an object of the invention to provide a process for extracting 6-aminopenicillanic acid from dilute aqueous solutions thereof into a lesser volume of an organic solvent. Another object of the invention is to provide a process for the recovery of crystalline 6-aminopenicillanic acid from aqueous ion exchange resin eluates. It is a particular object of the invention to provide a commercially useful method by which 6-aminopenicillanic acid can be recovered in high yields from filtered fermentation broths. Other objects and advantages of the invention will become apparent in the course of the following detailed description and illustration of the invention.

According to the present invention aqueous solutions of 6-aminopenicillanic acid are concentrated by a process comprising the steps of extracting an aqueous solution of 6-aminopenicillanic acid at a pH of from 5 to 7, preferably at a pH of 5.5 to 6.5, with a lesser amount of a substantially water-immiscible organic solvent having a specific type of amine dissolved therein, and separating the resulting solvent phase and aqueous phase.

We have found that the organic solvents useful in the process of this invention can be any of the solvents selected from the group consisting of the substantially water-immiscible alcohols having the formula ROH wherein R is an alkyl or cyclo-alkyl group having from 4 to 6 carbon atoms. The preferred organic solvent is n-butanol, though other substantially water-immiscible alcohols of like properties such as isobutyl, n-amyl, and cyclohexyl alcohols may also be used.

In carrying out the process of this invention it is desirable that from about one to ten volumes, preferably about five volumes, of solvent be used per volume of amine. We have also found it desirable in a process of recovery of 6-aminopenicillanic acid from fermentation broths to add about 0.5% v./v. of benzaldehyde to the broth prior to carrying out the extraction process of this invention.

The amines which are useful in the process of this invention are the amines and mixtures thereof which are liquid at room temperatures and soluble in the organic solvent and which have the formula

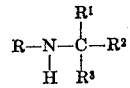

wherein R is an aliphatic group having from 10 to 14 carbon atoms and $R^1$, $R^2$, and $R^3$ are each alkyl groups having in the aggregate a total of from 11 to 14 carbon atoms. A preferred group of amines of the class described above are those amines and mixtures thereof which have the formula

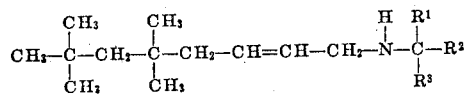

wherein each of $R^1$, $R^2$, and $R^3$ is an aliphatic hydrocarbon radical and wherein $R^1$, $R^2$, and $R^3$ contain in the aggregate from 11 to 14 carbon atoms. These liquid amines and mixtures thereof may be added to the solution in their free-base form and may be used in the form of their salts with ions such as chloride, sulfate, acetate, citrate, etc. The amount of such amines used in the solvent extraction step of the process is at least 0.5%, and preferably from 1.5% to 5%, by weight of the starting aqueous solution from which the 6-aminopenicillanic acid is being extracted. While greater amounts may be used, we have found that no significant advantage is gained by using more than from about 5 to 10% by weight of the starting aqueous solution.

In one embodiment of the invention, the organic solvent phase, e.g., a butanolic phase, resulting from the process steps described above is extracted with a lesser volume, e.g., one-half to one-tenth volume or less, of water at a pH of about 1 to 3, preferably at a pH of about 2, whereby a concentrated aqueous acidic solution of 6-aminopenicillanic acid is obtained. It is desirable to acidify the solvent phase prior to extraction with water; in the acidification of the solvent phase we prefer to use nitric acid, though sulfuric acid, hydrochloric acid, phosphoric acid, oxalic acid, etc., may also be used. The entire process may then be repeated if further concentration of the aqueous solution is desired, except where nitric acid has been used in the previous acidification step, or the 6-aminopenicillanic acid can be precipitated from the concentrated aqueous solution by known methods, e.g., those described in Belgian Patent No. 569,728. We have also found that 6-aminopenicillanic acid can be extracted from the solvent phase by an aqueous solution of sodium nitrate or calcium nitrate at a neutral pH.

We have also found that 6-aminopenicillanic acid can be precipitated directly from a rich butanolic phase resulting from the process steps described above by adding a source of nitrate ions to the butanolic phase which is adjusted to a pH of from 3 to 5, and preferably to a pH of 3.5 to 4.5. In carrying out this procedure, we have found it desirable to add about 10% by weight of the solvent phase of sodium nitrate or of an equivalent nitrate salt to the solvent phase, which is then adjusted to the proper pH with nitric acid. The precipitated 6-aminopenicillanic acid may then be collected by conventional means.

The amount of organic solvent employed may be varied widely, though of course a higher degree of concentration of the 6-aminopenicillanic acid is obtained when lesser volumes of solvent are used in the extraction step. It is also preferred to adjust the pH of the secondary amine-solvent extractant to about 5.5 to 6.5, i.e., to the pH of the aqueous solution of 6-aminopenicillanic acid, prior to carrying out the extraction. Efficiency of the process is of course increased by carrying out the extraction countercurrently in several stages.

The quantity of 6-aminopenicillanic acid present in a crude solid or solution can be measured indirectly by means of a procedure in which the 6-aminopenicillanic acid in the solution or solid to be measured is reacted under standardized conditions with phenoxyacetyl chloride to produce phenoxymethylpenicillin (penicillin V); this process is termed "activation" of 6-aminopenicillanic acid. The activated 6-aminopenicillanic acid is then assayed by comparison of its effectiveness as an antibiotic with penicillin V. Accuracy of the bioassay is improved where all of the penicillins (formed contemporaneously with the 6-aminopenicillanic acid) in the crude solid or solution are removed before activation of the acid, either by extraction of the aqueous test solution at pH 2–3 with ⅓ volume of butanol or more conveniently, by maintaining the test solution at pH 2–2.5 for about ½ hour whereupon all acid-unstable penicillins are decomposed.

In the general procedure of performing this assay a measured aliquot (10 ml.) of test solution is made alkaline with an excess of added solid sodium bicarbonate, then chilled in ice and a measured volume of acetone-containing phenoxyacetyl chloride is added. The amount of phenoxyacetyl chloride is usually 0.2 ml. to a test tube. The reaction mixture is shaken in ice for 15 to 20 minutes, then extracted with ½ volume ether. The extracted aqueous solution is then assayed against a standard of penicillin G or penicillin V.

The following specific examples will serve to further illustrate the process of this invention.

*Example 1*

A fermentation broth containing 6-aminopenicillanic acid is chilled, filtered and concentrated on an ion exchange column to provide an aqueous eluate assaying 3200 mcg./ml. One liter of this eluate is adjusted to pH 6.0 with hydrochloric acid and is extracted countercurrently in two stages with 350 mls. of n-butanol containing 50 mls. of a mixture of secondary amines wherein each secondary amine has the formula

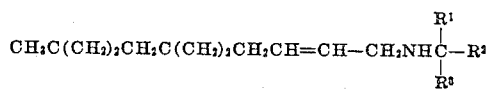

wherein each of $R^1$, $R^2$, and $R^3$ is an aliphatic hydrocarbon radical and wherein $R^1$, $R^2$, and $R^3$ contain in the aggregate from 11 to 14 carbon atoms; this particular mixture of secondary amines, which is sometimes referred to in the following examples as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.— 4%, 160 to 210° C.—5%, 210 to 220° C.—74%, above 220° C.—17% . The rich butanolic extract (400 ml.) is divided into two 200 ml. portions. To one 200 ml. portion of the rich butanolic extract is added 20 gm. sodium nitrate and the pH of the mixture is adjusted to 4 with nitric acid whereupon 1.0 gm. of 6-aminopenicillanic acid (45.7% yield) assaying 780 mcg./mg. is precipitated and recovered. The second 200 ml. is adjusted to pH 4 with nitric acid whereupon 0.78 gm. of 6-aminopenicillanic acid (43.8% yield) assaying 960 mcg./mg. is precipitated and collected by filtration.

*Example 2*

A solution of 5.0 gm. of 6-aminopenicillanic acid in 1,000 ml. of water is first adjusted to pH 2 with sulfuric acid, mixed with an organic solvent solution (pH 6.5) containing 400 ml. of n-butanol and 50 ml. of Liquid Amine Mixture No. I and the resulting mixture is adjusted to pH 6.5 with sodium hydroxide. The resulting organic solvent phase (rich butanolic phase) is separated from the aqueous phase (containing 560 mcg./ml. of 6-aminopenicillanic acid by bioassay) and divided into 100 ml. portions.

(A) One 100 ml. portion of the rich butanolic phase is extracted at pH 2 with 25 ml. of water and the resulting aqueous acidic extract is adjusted to pH 4.3 with sodium hydroxide whereupon 0.4 gm. of 6-aminopenicillanic acid (assaying 1000 mcg./mg.) is precipitated from the aqueous solution and collected by filtration.

(B) Twenty-five ml. of water is added to the second 100 ml. portion of the rich butanolic phase which is then adjusted to pH 2 with dilute nitric acid. The resulting aqueous acidic phase (29 ml.) is separated and adjusted to pH 4.3 with sodium hydroxide whereupon 0.44 gm. of 6-aminopenicillanic acid is precipitated from solution and collected by filtration.

(C) A third 100 ml. portion of the rich butanolic phase is mixed with 25 ml. of water and 10.0 gm. of sodium nitrate and the mixture is acidified to pH 2 with nitric acid. The resulting aqueous acidic phase (33 ml.) is separated and adjusted to pH 4.3 with sodium hydroxide whereupon 0.14 gm. of 6-aminopenicillanic acid is precipitated from solution and collected by filtration.

(D) Ten grams of sodium nitrate is added to a fourth 100 ml. portion of the rich butanolic phase which is then adjusted to pH 4 with nitric acid whereupon 0.64 gm. of 6-aminopenicillanic acid is precipitated from the resulting solution and collected by filtration.

*Example 3*

A solution of 5.0 gm. of 6-aminopenicillanic acid in 1000 ml. of water is adjusted to pH 4 with acetic acid and mixed with an organic solvent solution containing 400 ml. of n-butanol and 50 ml. of Liquid Amine Mixture No. I. The mixture is adjusted to pH 6.5 with sodium hydroxide and the resulting butanolic phase is separated from the aqueous phase (which has a potency of 2000 mcg./ml. of 6-aminopenicillanic acid), and divided into 100 ml. portions.

A. Ten gm. of sodium nitrate is added to the first 100 ml. portion which is then adjusted to pH 4.0 with nitric acid whereupon 0.4 gm. of 6-aminopenicillanic acid (bioassay of 900 mcg./mg.) is precipitated and collected by filtration.

B. Ten gm. of sodium nitrate is added to a second 100 ml. portion which is then adjusted to pH 6.8 and extracted with 15 ml. of water. The resulting aqueous extract is adjusted to pH 4.3 whereupon 0.14 gm. of 6-aminopenicillanic acid is precipitated and collected by filtration.

C. Ten gm. of sodium nitrate is added to a third 100 ml. portion which is then adjusted to pH 3 with nitric acid whereupon 0.36 gm. of 6-aminopenicillanic acid (bioassay, 860 mcg./mg.) is precipitated and collected by filtration.

D. A 100 ml. portion of rich butanolic extract is mixed with 100 ml. of a 50% solution of calcium nitrate and the resulting solution is adjusted to pH 4.0 with nitric acid whereupon 0.54 gm. of 6-aminopenicillanic acid (bioassay, 980 mcg./mg.) is precipitated and collected by filtration.

*Example 4*

A fermentation broth containing 6-aminopenicillanic acid is chilled and filtered according to conventional procedures. The filtered broth is adjusted to pH 6.5 and extracted countercurrently in three stages with about one-third volume of n-butanol containing 2.5% of the volume of broth volume of a mixture of secondary amines wherein each secondary amine has the formula

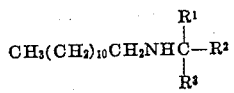

wherein each of $R^1$, $R^2$, and $R^3$ is a monovalent aliphatic hydrocarbon radical and wherein $R^1$, $R^2$, and $R^3$ contain in the aggregate from eleven to fourteen carbon atoms. This particular mixture of secondary amines, which is sometimes referred to in these examples as "Liquid Amine Mixture No. II," is a clear amber liquid having the following physical characteristics: viscosity at 25° C. of 70 cps., specific gravity at 20° C. of 0.826; refractive index at 25° C. of 1.4554; distillation range at 10 mm., up to 170° C. —0.5%, 170–220° C. —3%, 220–230° C. —90% and above 230° C. —6.5%. The resulting rich butanolic extract is separated from the aqueous phase adjusted to pH 2 with hydrochloric acid and extracted with one-third volume of water at pH 2. The resulting rich aqueous extract is then adjusted to pH 6.5 and re-extracted with one-third volume of the butanol-amine mixture described above. Calcium nitrate, amounting to 10 gm./ml. of extract, is then added to the butanolic extract which is then adjusted to pH 4.5 with 6 N nitric acid whereupon 6-aminopenicillanic acid is precipitated and collected by filtration.

*Example 5*

Ten liters of a filtered fermentation broth having a potency of 230 mcg./ml. of 6-aminopenicillanic acid and containing 0.5% v./v. of benzaldehyde is adjusted to pH 6 and extracted counter-currently with a solution of 150 ml. of Liquid Amine Mixture No. I and 2000 ml. of n-butanol, the solution being first adjusted to pH 6 with hydrochloric acid. The resulting butanolic extract is then mixed with 250 ml. of water and the mixture is adjusted to pH 2 with 4N hydrochloric acid and the resulting butanolic phase is then extracted again with 100 ml. of water at pH 2 and the resulting aqueous extract is combined with the first aqueous phase to give 385 ml. of a rich aqueous solution having a potency of 2200 mcg./ml. The 385 ml. aqueous solution is mixed with 150 ml. n-butanol and 20 ml. Liquid Amine Mixture No. I and the mixture is adjusted to pH 6 with sodium hydroxide. The resulting aqueous phase and butanolic phase are separated and the butanolic phase is adjusted to pH 2 and extracted with a 15 ml. and a 10 ml. portion of water at pH 2. The aqueous extracts are combined and adjusted to pH 4.3 with sodium hydroxide whereupon 0.27 gm. of 6-aminopenicillanic acid is precipitated and collected by filtration.

*Example 6*

One liter of rich aqueous eluate having a potency of 3200 mcg./ml. of 6-aminopenicillanic acid by bioassay (obtained as in Example 5 above) is mixed with 350 ml. of n-butanol containing 50 ml. of Liquid Amine Mixture No. II. The mixture is adjusted to pH 6 and the resulting butanolic phase is recovered and divided into two equal parts.

One portion of the rich butanolic extract is extracted with water at pH 2. The resulting aqueous extract is adjusted to pH 4.3 with sodium hydroxide whereupon 0.26 gm. of pure 6-aminopenicillanic acid (assaying 1000 mcg./mg.) is precipitated and collected by filtration.

Ten grams of sodium nitrate/100 ml. of extract is added to the other portion of the rich butanolic extract which is then adjusted to pH 4.0 with nitric acid whereupon 0.52 gm. of 6-aminopenicillanic acid (assaying 780 mcg./mg.) is precipitated and collected by filtration.

*Example 7*

A 750 gal. portion of an aqueous ion exchange column eluate having a 6-aminopenicillanic acid content of 2750 mcg./ml. by bioassay is adjusted to pH 6.0 with hydrochloric acid. A solvent solution containing 30 gal. of Liquid Amine Mixture No. I (about 3.4% by weight of the eluate) and 220 gal. of n-butanol is acidified to pH 6.0 with hydrochloric acid, 13 ml. of concentrated hydrochloric acid being required per 100 ml. of amine. The aqueous eluate (750 gal.) is then extracted countercurrently with the solvent solution (250 gal.) using a Luwesta countercurrent centrifuge. The spent aqueous eluate is found to contain 800 mcg./ml. of 6-aminopenicillanic acid by bioassay. The rich butanolic extract, amounting to 250 gal., is added continuously as it is made into a tank containing 94 kg. of sodium nitrate and the resulting mixture is continuously adjusted to pH 3.8–4.2 with nitric acid. The rich butanolic extract is chilled, stirred for two hours whereupon crude 6-aminopenicillanic acid is precipitated from the two phase solution and collected by filtration. The aqueous phase (40 gal.) of the mother liquor after removal of the precipitated solids has a potency of 1900 mcg./ml., and the butanolic phase (212 gal.) has a potency of 280 mcg./ml. The crude precipitate is washed with cold water and acetone and assayed.

The crude wet 6-aminopenicillanic acid (10.725 kg.) has a potency of 375 mcg./mg.; a small dried sample of the crude wet 6-aminopenicillanic acid indicates a yield of 6.435 kg. having a potency of 800 mcg./mg. Upon recrystallization the crude solids yield 3.535 kg. of 6-aminopenicillanic acid assaying 920 mcg./mg.

*Example 8*

In the recrystallization of 6-aminopenicillanic acid, crude solids containing volatile solvents are mixed with sufficient water to make a thick slurry and the mixture is neutralized to pH 6.8–7.0 with concentrated sodium hydroxide solution. The neutralized mixture is then diluted with the minimum amount of water to dissolve the remaining solids. The total volume of the solution is kept to a volume not greater than 1 liter for each 100 gm. estimated dry weight of 6-aminopenicillanic acid in order to obtain maximum recovery of the product. To the solution is added activated charcoal (Darco KB) at a level of 1.6 gm./liter of solution and the mixture is stirred for 10–20 minutes and filtered. The clear filtrate is acidified slowly to pH 4.3–4.5 with concentrated hydrochloric acid. Crystalline solids precipitate during the acidification. The acidic mixture is stirred for one-half hour (preferably in the cold) and the crystalline 6-aminopenicillanic acid collected by filtration. The crystals are washed first with a small quantity of slightly acidified water, then with a small amount of acetone and dried under vacuum at room temperature for several hours.

The recrystallized crystals of 6-aminopenicillanic acid are white or light tan, have a potency of 1000 mcg./mg. (by bioassay) and melt at 209–210° C. Recovery of 6-aminopenicillanic acid activity from crude crystals to recrystallized precipitate is ordinarily in excess of 90%.

While in the foregoing specification various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of the invention.

We claim:
1. A process comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 5 to 7 with a lesser volume of an organic solvent selected from the group consisting of the substantially water-immiscible alcohols having the formula ROH wherein R is selected from the group consisting of alkyl and cycloalkyl groups having from 4 to 6 carbon atoms, said organic solvent having dissolved therein from about 0.5 percent to 10.0 percent by weight of said aqueous solution of a secondary amine selected from the group consisting of the secondary amines having the formula

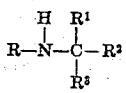

wherein R is an aliphatic group having from 10 to 14 carbon atoms and $R^1$, $R^2$, and $R^3$ are each alkyl groups having a total of from 11 to 14 carbon atoms, said secondary amine being liquid at room temperatures and soluble in said organic solvent, and separating the organic solvent phase containing the major portion of the 6-aminopenicillanic acid originally dissolved in said aqueous solution of 6-aminopenicillanic acid.

2. A process for concentrating aqueous solutions of 6-aminopenicillanic acid which comprises the steps of extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 5 to 7 with a lesser volume of n-butanol having dissolved therein from 0.5 to 5 percent by weight of said aqueous solution of a secondary amine selected from the group of secondary amines having the formula

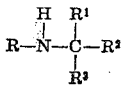

wherein R is an aliphatic group having from 10 to 14 carbon atoms and $R^1$, $R^2$, and $R^3$ are each alkyl groups having a total of from 11 to 14 carbons atoms, said secondary amine being liquid at room temperatures and soluble in said organic solvent; separating the aqueous phase and the organic solvent phase; and extracting said n-butanol phase with a lesser volume of water at a pH of from about 1 to 3 whereby a concentrated aqueous solution of 6-aminopenicillanic acid is obtained.

3. A process for concentrating aqueous solutions of 6-aminopenicillanic acid which comprises the steps of extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 5.5 to 6.5 with a lesser volume of n-butanol, said organic solvent having dissolved therein from 1.5 to 5% by weight of said aqueous solution of a secondary amine selected from the group of secondary amines having the formula

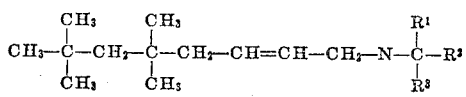

wherein each of $R^1$, $R^2$, and $R^3$ is an aliphatic hydrocarbon radical and $R^1$, $R^2$, and $R^3$ contain in the aggregate from 11 to 14 carbon atoms; separating the aqueous phase and the organic solvent phase, and extracting said organic solvent phase with a lesser volume of water at a pH of from about 1 to 3 whereby a concentrated aqueous acidic solution of 6-aminopenicillanic acid is obtained.

4. A process for the recovery of 6-aminopenicillanic acid from dilute aqueous solutions thereof comprising extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of about 6 with about one-fifth volume of n-butanol containing an amount of a compound selected from the group consisting of the compounds having the formula

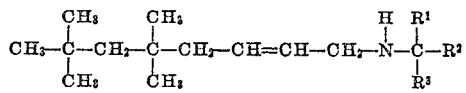

wherein each of $R^1$, $R^2$, and $R^3$ is an aliphatic hydrocarbon radical and $R^1$, $R^2$, and $R^3$ contain in the aggregate from 11 to 14 carbon atoms, equal to about 2.5% by weight of the aqueous solution of 6-aminopenicillanic acid, whereby said 6-aminopenicillanic acid is extracted into n-butanol; separating the aqueous phase and the n-butanol phase; extracting said n-butanol phase with a lesser volume of water at a pH of about 2 whereby a concentrated aqueous solution of 6-aminopenicillanic acid is obtained; and isolating crystalline 6-aminopenicillanic acid from said concentrated aqueous solution of 6-aminopenicillanic acid.

5. A process for the recovery of 6-aminopenicillanic acid from aqueous solutions thereof which comprises the steps of extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 5.5 to 6.5 with a lesser volume of n-butanol, said organic solvent having dissolved therein from 0.5% to 5.0% by weight of said aqueous solution of a secondary amine selected from the group of secondary amines having the formula

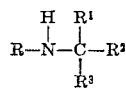

wherein R is an aliphatic group having from 10 to 14 carbon atoms and $R^1$, $R^2$, and $R^3$ are each alkyl groups having a total of from 11 to 14 carbon atoms, said secondary amine being liquid at room temperatures and soluble in said organic solvent; separating the aqueous phase and the organic solvent phase; adjusting the pH of said organic solvent phase from 3 to 5, adding a source of nitrate ions to said organic solvent phase, and separating precipitated 6-aminopenicillanic acid from said organic solvent phase.

6. A process for the recovery of 6-aminopenicillanic acid from aqueous solutions thereof which comprises the step of extracting one volume of an aqueous solution of 6-aminopenicillanic acid, said aqueous solution of 6-aminopenicillanic acid containing essentially only materials resulting from the biosynthesis of 6-aminopenicillanic acid and materials introduced in processing such solutions, at a pH of from about 5.5 to 6.5 with a lesser volume of an organic solvent selected from the group consisting of methyl isobutyl ketone and n-butanol, said organic solvent having dissolved therein from 1.5% to 5.0% by weight of said aqueous solution of a secondary amine selected from the group of secondary amines having the formula

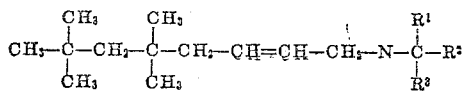

wherein each of $R^1$, $R^2$, and $R^3$ is an aliphatic hydrocarbon radical and $R^1$, $R^2$, and $R^3$ contain in the aggregate from 11 to 14 carbon atoms; separating the aqueous phase and the organic solvent phase; adjusting the pH of said organic solvent phase from 3 to 5, adding a source of nitrate ions to said organic solvent phase, and separating precipitated 6-aminopenicillanic acid from said organic solvent phase.

References Cited in the file of this patent

UNITED STATES PATENTS

| | | |
|---|---|---|
| 2,547,640 | Goldman et al. | Apr. 3, 1951 |
| 2,941,995 | Doyle et al. | June 21, 1960 |

FOREIGN PATENTS

| | | |
|---|---|---|
| 569,728 | Belgium | Nov. 15, 1958 |
| 745,414 | Great Britain | Feb. 22, 1956 |